(12) United States Patent
Moas et al.

(10) Patent No.: US 8,935,762 B2
(45) Date of Patent: Jan. 13, 2015

(54) AUTHENTICATION SYSTEM AND METHOD (75) Inventors: Guy Moas, Cardiff (GB); Ram Gabay, Cardiff (GB)

(73) Assignee: G3-Vision Limited, London (GB)

( * ) Notice: Subject to any disclaimer, the term of this patent is extended or adjusted under 35 U.S.C. 154(b) by 998 days.

(21) Appl. No.: 12/666,767

(22) PCT Filed: Jun. 26, 2007

(86) PCT No.: PCT/GB2007/002375
§ 371 (c)(1),
(2), (4) Date: Dec. 24, 2009

(87) PCT Pub. No.: WO2009/001020
PCT Pub. Date: Dec. 31, 2008

(65) Prior Publication Data
US 2010/0180328 A1  Jul. 15, 2010

(51) Int. Cl.
*H04L 29/06* (2006.01)
*G06F 21/34* (2013.01)
*G06Q 20/04* (2012.01)
(Continued)

(52) U.S. Cl.
CPC ............ *H04L 63/0838* (2013.01); *G06F 21/34* (2013.01); *G06Q 20/04* (2013.01); *G06Q 20/385* (2013.01); *G06Q 20/40* (2013.01);
(Continued)

(58) Field of Classification Search
CPC ........ G06F 21/34; G06Q 20/02; G06Q 20/04; G06Q 20/385; G06Q 20/40; H04L 63/0838
USPC .................................. 726/4, 5, 30; 380/44, 47
See application file for complete search history.

(56) References Cited

U.S. PATENT DOCUMENTS 5,343,529 A   8/1994   Goldfine et al.
5,491,752 A   2/1996   Kaufman et al.
(Continued)

FOREIGN PATENT DOCUMENTS

CN   1937498 A   3/2007
EP   0636963 A2  2/1995
(Continued)

OTHER PUBLICATIONS

M'Raihi, et al. "Mutual Oath: HOTP Extensions for Mutual Authentication" (Dec. 2005), pp. 1-14.

*Primary Examiner* — Justin T Darrow
(74) *Attorney, Agent, or Firm* — Kramer Amado P.C.

(57) ABSTRACT

An authentication server and user device are provided. The authentication server includes: a memory for storing a user identification code associated with a user; a function generator for generating a plurality of functions, the functions adapted to produce a pass code based on the user identification code; a memory for storing a function associated with the user; an application generator for generating an application adapted to implement the function on a user device; an application distributor for distributing the application to the user device; a transaction code generator for generating a transaction code for a transaction; a transaction code distributor for supplying the transaction code to the application; and a controller for receiving a pass code for the transaction from the user device and for authenticating the transaction based on the received pass code, the function, the user identification code and the transaction code.

17 Claims, 6 Drawing Sheets

(51) Int. Cl.
*G06Q 20/38* (2012.01)
*G06Q 20/40* (2012.01)

(52) U.S. Cl.
CPC ......... *H04L63/0861* (2013.01); *H04L 63/0869* (2013.01); *H04L 63/168* (2013.01)
USPC ................... 726/5; 726/30; 713/168; 380/44; 380/47

(56) References Cited

U.S. PATENT DOCUMENTS

| | | | |
|---|---|---|---|
| 5,592,553 | A | 1/1997 | Guski et al. |
| 5,661,807 | A | 8/1997 | Guski et al. |
| 5,668,876 | A | 9/1997 | Falk et al. |
| 5,737,421 | A | 4/1998 | Audebert |
| 5,742,686 | A | 4/1998 | Finley |
| 5,815,573 | A | 9/1998 | Johnson et al. |
| 5,937,068 | A | 8/1999 | Audebert |
| 6,738,907 | B1 | 5/2004 | Carter |
| 7,886,962 | B2 * | 2/2011 | Vawter ........................ 235/379 |
| 2001/0003177 | A1 * | 6/2001 | Schena et al. ................. 705/27 |
| 2002/0073345 | A1 | 6/2002 | Esfahani et al. |
| 2002/0099942 | A1 | 7/2002 | Gohl |
| 2003/0172272 | A1 | 9/2003 | Ehlers et al. |
| 2003/0204726 | A1 | 10/2003 | Kefford et al. |
| 2004/0083373 | A1 | 4/2004 | Perkins |
| 2004/0172535 | A1 | 9/2004 | Jakobsson |
| 2005/0044377 | A1 | 2/2005 | Huang |
| 2005/0069137 | A1 | 3/2005 | Landrock |
| 2005/0114675 | A1 | 5/2005 | Ginzburg |
| 2005/0245257 | A1 | 11/2005 | Woodhill |
| 2005/0268107 | A1 | 12/2005 | Harris et al. |
| 2006/0020559 | A1 * | 1/2006 | Steinmetz ....................... 705/67 |
| 2006/0031174 | A1 * | 2/2006 | Steinmetz ....................... 705/67 |
| 2006/0059344 | A1 | 3/2006 | Mononen |
| 2006/0094401 | A1 | 5/2006 | Eastlake, III |
| 2007/0130463 | A1 | 6/2007 | Law |
| 2007/0174904 | A1 | 7/2007 | Park |
| 2007/0226784 | A1 | 9/2007 | Ueda et al. |
| 2007/0234063 | A1 | 10/2007 | Ueda et al. |
| 2007/0262852 | A1 | 11/2007 | Yamamura et al. |
| 2008/0010673 | A1 | 1/2008 | Makino et al. |
| 2008/0048022 | A1 * | 2/2008 | Vawter ........................ 235/380 |
| 2010/0051686 | A1 * | 3/2010 | Obi ............................... 235/379 |

FOREIGN PATENT DOCUMENTS

| | | |
|---|---|---|
| EP | 0936530 A1 | 8/1999 |
| EP | 0891610 81 | 5/2002 |
| EP | 1646174 A1 | 4/2006 |
| EP | 0891611 B1 | 7/2006 |
| EP | 1500226 B1 | 6/2007 |
| GB | 2300288 A | 10/1996 |
| GB | 2440358 A | 1/2008 |
| JP | 2001067320 A | 3/2001 |
| JP | 2002132728 A | 5/2002 |
| JP | 2002312325 A | 10/2002 |
| JP | 2002328898 A | 11/2002 |
| JP | 2006344240 A | 12/2006 |
| JP | 2007226763 A | 9/2007 |
| KR | 100412986 B1 | 12/2003 |
| WO | WO2005002131 A1 | 1/2005 |
| WO | WO2006052203 A1 | 5/2006 |
| WO | WO2006066322 A1 | 6/2006 |
| WO | WO2006091301 A2 | 8/2006 |
| WO | WO2007006771 A1 | 1/2007 |
| WO | WO2007143795 A1 | 12/2007 |
| WO | WO2008019194 A2 | 2/2008 |
| WO | WO2008032916 A1 | 3/2008 |

* cited by examiner

AUTHENTICATION SYSTEM AND METHOD

PRIORITY

This application claims priority to PCT/GB2007/002375, published as WO 2009/001020 A1, the entire contents of which is incorporated herein by reference.

FIELD OF THE INVENTION

In general, the invention relates to identity or password authentication in communications systems. In particular, the invention relates to systems having one or more user devices and a communication system. The communication system may include a server providing services. In such systems a client device performs authentication with the communication system by using passwords and other security measures. The invention may also be used to authenticate users of other services where the transaction is person to person. Business-to-business applications are also envisaged.

BACKGROUND OF THE INVENTION

For many purposes, including transactions and other communications on communication networks, passwords will provide the most widely accepted authentication method for the foreseeable future. Password based authentication is readily available independent of network and device technologies.

Passwords can be vulnerable to interception (known as "snooping") while being transmitted to the authenticating machine or person. If the password is carried as electrical signals on unsecured physical wiring between the user access point and the central system controlling the password database, it is subject to snooping by wiretapping methods. If it is carried over the Internet, anyone able to watch the packets containing the logon information can snoop with very little possibility of detection. Cable modems may be more vulnerable to snooping than DSL and dialup connections, and ethernet may or may not be snoopable, depending particularly on the choice of networking hardware and wiring. Some organizations have noted a significant increase in stolen passwords after users began using cable internet connections.

The risk of interception of passwords sent over the Internet can be reduced with the Transport Layer Security (TLS, previously called SSL) feature built into many Internet browsers. Most browsers display a closed lock icon when TLS is in use.

Unfortunately, there is a conflict between stored hashed-passwords and hash-based challenge-response authentication; the latter requires a client to prove to a server that he knows what the shared secret (the password) is, and to do this, the server end needs to be able to obtain the shared secret from its stored form. On UNIX-type systems doing remote authentication, the shared secret becomes the hashed form and has the serious limitation that they expose passwords to offline guessing attack.

Rather than transmitting the password, password-authenticated key agreement systems can perform a zero-knowledge password proof, which proves knowledge of the password without revealing it. Taking it a step further, augmented systems for password-authenticated key agreement (e.g. AMP, B-SPEKE, PAK-Z, SRP-6) avoid both the conflict and limitation of hash-based methods; An augmented system allows a client to prove knowledge of the password to a server, where the server knows only a (not exactly) hashed password, and where the unhashed password is required to gain access.

Two-factor authentication (TFA) is an authentication technique that requires two independent ways to establish identity and privileges. This contrasts with traditional password authentication, which requires only one 'factor' (for example, knowledge of a static password) in order to gain access to a system.

The two 'factors' are generally:
'Something you know', such as a password or PIN.
'Something you have', such as a credit card or hardware token.

Traditionally, two-factor authentication requires hardware tokens, which are expensive to distribute.

US-A-2003/0204726 discloses a method and system for secure transmission of information. A client sends to a server, a request, at least one unique identifier and an encryption key. The server generates a reply to the request and identifies a mobile device (based on the at least one unique identifier) to which to send the reply. The reply is encrypted using the encryption key. The encrypted reply is sent from the server to the identified client device. The request may be a request for an OTP.

US-A-2006/0059344 discloses an authentication service and aims to provide effective password delivery in communication systems. The technique disclosed comprises receiving key information for calculating at least one password by a user equipment from a communication network system via a secure channel, generating at least one password on the basis of the key information in the user equipment, and performing authentication between the user equipment and the communication network system using the at least one password. The intention is that password security and management be improved to reach the largest possible user base without authentication being the bottleneck for launching new services in mobile networks. Recently mobile operator's WLAN (Wireless Local Area Network) and xDSL (Digital Subscriber Line) authentication and access independent use of IMS (IP Multimedia Subsystem) and PoC (Push to talk over Cellular) services have suffered from strong coupling between the authentication, access network and terminal technologies. To minimize the SMS (Short Message Service) load that a conventional http digest password delivery causes, a Seed and Hash Approach is used. An entity in the communication network system, e.g. an operator's own service management system with a terminal management server generates the seed and optionally a (new) secret key, and sends it/them to the user equipment or terminal over SMS. The service management system generates and sends a new seed (and secret key) to the terminal after the number of generated passwords reaches a configurable threshold or a timeout expires. Requiring a subscriber to enter a PIN code before applying the hash function enhances the security of the mechanism. Applying different seeds, secret keys and/or hash functions can create password domains.

US-A-2005/0245257 discloses a system and method of using the PSTN in providing authentication or authorisation for online transactions. Using substantially simultaneous transmissions on two different networks to verify a user's identity. US-A-2006/0036857 discloses user authentication based on linking between a randomly generate authentication secret and a personalised secret.

US-A-0114675 discloses user authentication by creating a key in the form of a user formula, presenting a user with an arrangement of variables, each assigned a value, applying the assigned values to matching variables in the user formula and calculating a first result; the user is authenticated if the first result matches a second result of a separate and independent calculation of the user formula.

US-A-2005/0069137 discloses a method of distributing the public key of an asymmetric key pair with a private key and the public key from a mobile station to a key managing computer, the method comprising communicating an OTP from the key managing computer to the mobile station by mean of a secure channel to provide a shared secret, first and second codes are calculated at the mobile station and the key managing computer respectively, transmitting the first code and the public key to the key managing computer, checking the authenticity of the user by comparing the first and second codes.

US-A-2003/0172272 discloses authentication of a user identity, which uses two separate communication channels, including a communications network and a mobile communication channel. US-A-2005/0268107 discloses authentication of users via any one of two or three of 1) something the user knows; 2) something the user has; and 3) a physical characteristic of the user.

US-A-2006/0094401 discloses authentication in a wireless communication network. A secret is shared between a mobile and a home device. A remote device determines whether the mobile device can connect to the remote device by concurrently sending a challenge to the mobile and home devices and comparing the results.

A transaction authentication number, or TAN, is used by some online banking services as a form of single use passwords to authorize financial transactions. TANs are a second layer of security above and beyond the traditional single-password authentication.

An outline of how TANs function:
1. The bank creates a set of unique TANs for the user. Typically, there are 50 TANs printed on a list, each 8 characters long, which is enough to last half a year for a normal user.
2. The user picks up the list from the nearest bank branch. The user must typically identify him/herself through presenting a passport, an ID card or similar document.
3. A few days later, the user receives a 5 digit password by mail to the user's home address. The user is requested to memorise the password, destroy the notice and keep the TAN list in a safe place near the PC.
4. To log on to his/her account, the user must enter a user name and password. This may give access to account information but the ability to process transactions is disabled.
5. To perform a transaction, the user enters the request and "signs" the transaction by entering an unused TAN. The bank verifies the TAN submitted against the list of TANs they issued to the user. If it is a match, the transaction is processed. If it is not a match, the transaction is rejected.
6. The TAN has now been consumed and will not be recognized for any further transactions.
7. If the TAN list is compromised, the user may cancel it by notifying the bank.

TANs are believed to provide additional security because they act as a form of two-factor authentication. If the physical document containing the TANs is stolen, it will be of little use without the password. On the other hand, if a hacker cracks the user's password, they can not process transactions without the TAN.

SUMMARY OF THE INVENTION

The invention provides an authentication system for granting permission to a user having a user device to perform a transaction, the system comprising, means for storing a user identification code associated with said user; means for generating a plurality of functions for producing a pass code based on at least one input by a user, said at least one input comprising said user identification code; means for storing at least one function and associating said function with a user; means for generating an application adapted to implement said at least one function on the user device; means for supplying the application to said user device; means for generating a transaction code associated with said transaction and for supplying the transaction code to said application; and means for receiving a pass code for said transaction from the user device and for authenticating the transaction on the basis of the received pass code, the function associated with said user, the user identification code and the transaction code associated with said transaction. In an embodiment a unique OTP function is used per user, which results in an extremely secure authentication protocol. If a hacker is able to intercept and decrypt an OTP function, it will only affect one user. Even if this were to happen, the user's account would still be secure as, without the user's identification code, the function would be useless.

In an embodiment the plurality of functions are symmetric or reversible functions such that at least one input can be derived from knowledge of the remaining inputs, the function and the output. At least two of said functions may be functionally unique. The at least two functions may be associated with different users.

The application may be adapted to implement more than one of said functions. The system may be adapted to send a control code to said application to select one of said functions. The user identification code and the transaction codes may be used as inputs to said function.

The transaction code may be used to select one of said functions to implement for said transaction.

The means for generating a plurality of functions may comprise a library of function components and means for selecting randomly from said function components to provide said composite function. The function components may comprise components selected from the group consisting of: mathematical functions, mathematical operations, string manipulation, date calculation, bit manipulation, computer logic commands, computer logic flows, computer logic conditions, embedded hard coded values, and data structure processing.

The means for generating a plurality of functions comprises means for validating the functions. The means for validating the functions may perform a comparison with a predetermined selection of previously generated function and reject the generated function if a predetermined level of duplication is exceeded. In an embodiment each function in a batch of functions is unique.

The application adapted to implement said at least one function may provide a user interface.

The means for supplying the application to the user device may comprise a means for sending an electronic message to the user device, the message including an address from which the application can be downloaded.

The invention also provides an authentication method comprising, storing a user identification code associated with said user; generating a plurality of functions for producing a pass code based on at least one input by a user, said at least one input comprising said user identification code; storing at least one function and associating said function with a user; generating an application adapted to implement said at least one function on the user device; supplying the application to said user device; generating a transaction code associated with said transaction and supplying the transaction code to said application; and receiving a pass code for said transaction from the user device and authenticating the transaction on the basis of the received pass code, the function associated with said user, the user identification code and the transaction code associated with said transaction.

Traditionally two-factor authentication requires hardware tokens, which are expensive to distribute. In the present invention the second factor of the two-factor authentication process, the 'something you have' factor, is a software solution that produces a One Time Password (OTP). As the name suggests, an OTP is a password which is valid for one transaction, or combination of transactions that constitute a single set, the next transaction will require a different OTP.

The present invention can be implemented in any convenient form, for example using dedicated hardware, or a mixture of dedicated hardware and software. The present invention is particularly suited to implementation as computer software implemented by a server, workstation or laptop computer. The invention may further comprise a network, which can include any local area network or even wide area, conventional terrestrial or wireless communications network. The systems may comprise any suitably programmable apparatuses such as a general purpose computer, personal digital assistant, mobile telephone (such as a WAP or 3G-compliant phone) and so on. Aspects of the present invention encompass computer software implementable on a programmable device. The computer software can be provided to the programmable device using any conventional carrier medium. The carrier medium can comprise a transient carrier medium such as an electrical, optical, microwave, acoustic or radio frequency signal carrying the computer code. An example of such a transient medium is a TCP/IP signal carrying computer code over an IP network, such as the Internet. The carrier medium can also comprise a storage medium for storing processor readable code such as a floppy disk, hard disk, CD ROM, magnetic tape device or solid state memory device.

The invention will now be described in more detail and by way of example only with reference to the accompanying drawings, in which:

DESCRIPTION OF THE EMBODIMENTS

FIGS. 1 to 4 represent processes of an authentication method according to an embodiment of the invention.

Figure 1:
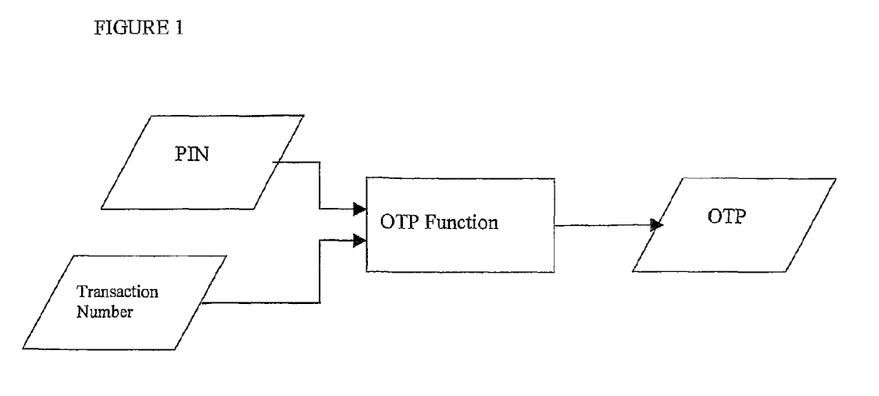
FIG. 1 is a flow diagram representing the generation of an OTP.

As shown in FIG. 1, a one-time password (OTP) is generated by an OTP function on the basis of a PIN, which is an example of a secret key, and a transaction number, which is an example of a transaction specific code. The transaction number identifies the transaction in which the OTP will be used to authenticate the user. The transaction number is typically provided to the user or user device when a request is made by the user to access a particular service or an Internet site, for example.

In an embodiment the user device is a mobile telephone of the type having at least SMS capability. The user device is capable of running a computer program provided by the authentication system as described below. The computer program, called herein an OTP application, may be provided to the user device in any suitable manner. The OTP application may be pre-installed on the user device before purchase of the device, or alternatively may be provided to the user device on request. A convenient method may be to download the OTP application from a secure location on the communication system controlled by the authentication server.

In the case where the OTP application is pre-installed on a user device, the OTP application may need to be registered at the authentication server. Registration can conveniently be performed by using a registration security code provided with the user device when purchased. The security code may be supplied to the authentication server, together with user identification details in order to associate the OTP application (and therefore the OTP function or functions) with the new user.

The user device may be any communication device, which may have a single communication channel, but modern devices tend to have two or more communication channels. Allowing plural communication channels on the same device. Plural communication channels may be provided also by using a different device for transferring some information for the authentication process. It is likely that embodiments of the invention will be implemented using a Java application capable of running on mobile telephone handsets. However, it is possible for it to be used on virtually any computer based platform, i.e. PDA's, set top boxes, etc. Embodiments of the present invention use a hardware device that the vast majority of Internet users already possess—a mobile phone. This not only greatly decreases implementation costs, but also improves the user experience by allowing them to use a device that they are familiar with. However, the user device can include any communication device that is able to run a suitable OTP application program and receive the necessary transaction code from the authentication system.

In the present embodiment the user is assigned or chooses a user identification code, which is an example of a secret key. Typically, the user identification code is a Personal Identification Number (PIN), for example a four-digit number. To improve security the PIN is defined by the user during registration and can be any length. Furthermore, whilst for ease the PIN is an actual number, any pass code including alphanumeric sequences could be used as is well known in the art. The authentication process may use more than one secret key either as part of a separate, additional authentication step, or as further inputs to the OTP function. The secret keys are communicated to the authentication server during a registration process. If there is more than one secret key then these may be communicated to the authentication server at different times and through different channels. For example, in the case where the OTP application is installed on a new user device such as a mobile telephone, user information can be communicated to the authentication server from, for example, a terminal at the shop at which the telephone was purchased. A PIN or other user identification code might then be selected by the user during a subsequent registration process.

Figure 2:
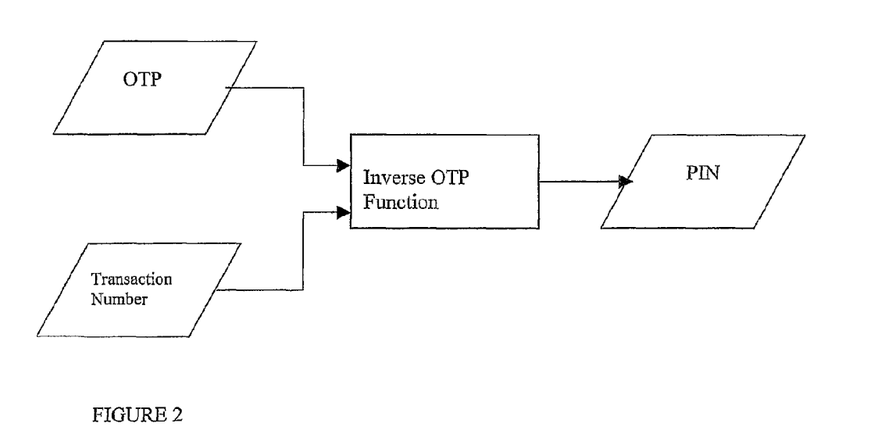
FIG. 2 is a flow diagram representing a PIN determination step performed during a registration process.

In an embodiment of a registration process of the present invention, the authentication server receives an OTP from the user device and performs the inverse of the OTP function to determine the PIN chosen by the user (FIG. 2). The PIN is then stored, together with any other user information, and is specifically associated with that user. It is desirable that the user information is store securely, for example on a secure server, which may be the authentication server.

In the present embodiment a transaction code or transaction number is generated for each transaction. The transaction number of the present embodiment is a random or pseudo random number generated on the server. Known random number generators are capable of generating numbers with sufficient randomness that it is virtually impossible to predict the next number that will be produced. The transaction numbers are, therefore, cryptographically secure. The random number generator may be implemented in hardware. A hardware random number generator is an apparatus that generates random numbers from a physical process. Such devices are typically based on microscopic phenomena such as thermal noise or the photoelectric effect or other quantum phenomena. A quantum-based hardware random number generator typically contains an amplifier to bring the output of the physical process into the macroscopic realm, and a transducer to convert the output into a digital signal.

The PIN and transaction number are the inputs to an OTP function (see FIG. 1). The OTP function is a randomly generated composite function, which comprises, in an embodiment, a number of partial functions, such as mathematical functions. The output of the OTP function is a unique OTP for each transaction using the PIN and transaction number as two inputs to the OTP application, as discussed below. Two inputs are the minimum inputs to the OTP application.

In some uses of the OTP application one or more of the inputs may be embedded in to the function or algorithm. There may be further inputs including further user information, for example, a date, an employee or account number, or other item of user identification information. Furthermore, in alternative embodiments further codes may be supplied to the OTP function by the authentication system. Whilst only a single transaction code is necessary, further codes may be supplied to change the behaviour of the OTP function as discussed below.

During registration (FIG. 3), the inverse of the OTP function associated with the user is used in order to determine the PIN a user has chosen based on a transaction number and an OTP. Whilst in the prior art, security of password generation is provided by encryption and the use of one-way hash functions, the present embodiment uses instead a reversible or symmetrical function, which makes authentication less computationally intensive. Security is provided by the provision of unique OTP functions for each user. Embodiments of the invention allow for a new OTP function for every transaction. Encryption can of course be used to improve security as is well known in the art.

Generally, each user is assigned a unique OTP function, whereby even if a hacker were to intercept and decrypt an OTP function, it would only affect one user. The security can be further increased by generating a unique OTP function for each transaction or group of transactions. Where the balance between security and processing power requires it, OTP functions could be assigned to more than one user or user device. It is a feature of the present invention that unique functions are derived for delivery to user devices. The system of the present invention makes it possible to calculate a vast number of unique symmetrical functions, which are tested for their validity and uniqueness. In theory, every single function used in the system could be different. Of course, depending on the security level required there might be an acceptable amount of re-use of functions. For example, if the number of users is very large the risk of re-using functions does not affect the level of security unacceptably. Furthermore, if a function has not been used for a long time, especially if it is not presently in use in the system, that is it is not already assigned to a user, then such a function need not be rejected by the system and may be embedded in an OTP application for provision to a user.

The unique OTP functions may be created in a batch process by a 'function generator' module provided by the authentication server. In the present embodiment, the function generator creates an OTP function, an inverse of the function, and a computer program (OTP Application), which provides the function with a user interface for entering a PIN and displaying the OTP. The displayed OTP may then be used in a registration or transaction process, possibly using a different device or in a person to person transaction, for example, at a bank. Alternatively, the OTP can be provided directly from the user or client device to the communication system for authentication by the authentication server. The number of OTP functions created in each batch process can be tailored to meet client's requirements (where the authentication system is being provided as a service to a third party), or set to automatically adjust based on recent transaction levels. If the system runs out of available OTP functions during the day, it is able to generate them on an ad-hoc basis.

The nature of the OTP application will depend on the platform for which the solution is being implemented. For a mobile telephone based implementation, for example, the computer program could be in the form of a Java application suitable for use on any modern mobile handset. For user devices that are not Java compliant other suitable programming languages could be used.

Registration Process

The purpose of the registration process is to supply the user with their unique OTP application and to obtain from them their chosen PIN. In an embodiment, the registration process includes the following steps:

User contacts the communication network or a client server to initiate a transaction The user is asked to register for the authentication process in order to proceed with the transaction User is supplied with an OTP application containing an OTP function, a transaction number is supplied to the OTP application by the authentication system User chooses PIN and enters it into OTP application.

OTP application uses the PIN and transaction number as inputs to the OTP function to generate an OTP, which can be supplied to the user or directly to the authentication system.

OTP is supplied to the authentication system.

The authentication system uses the inverse of the OTP function associated with the user to establish the user's PIN using the transaction number and the OTP supplied by the user Server securely stores the user's PIN. Note that this is the only place in which the PIN is stored—it is not stored by the OTP application and is not resident in the user device memory once the OTP function has been run to produce the OTP function.

The OTP may be supplied to the authentication system via a separate communication channel to the one used to send the OTP application and transaction number. For example, in a mobile 'phone based implementation, the OTP application may be obtained from an Internet website or a WAP site and the transaction number may be sent to the user via SMS. In an embodiment the user would submit the OTP via the Internet (possibly using a different device such as a PC). The use of separate communication channels is extremely secure as it virtually impossible for both to be compromised at once.

The use of multiple communication channels enhances security yet further, as it is virtually impossible for a hacker to compromise more than one simultaneously. Even if one element of the process can be intercepted or decrypted or otherwise obtained by a hacker, without all of the elements the system has not been compromised. For example, a hacker that obtains access to the one-time password application, for example by obtaining a mobile device on which the application is stored, cannot use the application without the user identification code.

Transaction Process

Figure 4:
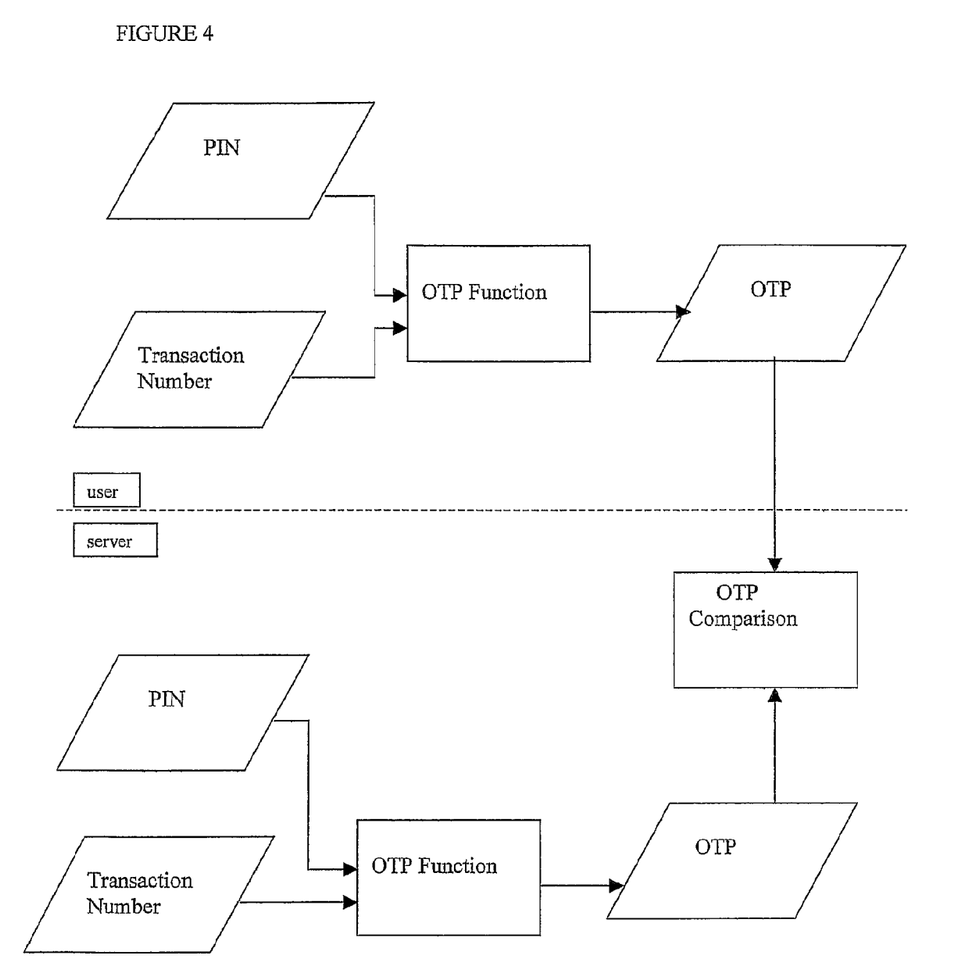
FIG. 4 is a flow diagram representing a transaction process according to the present invention.

The purpose of the transaction process is to establish the authenticity of a user by ensuring that they know the PIN associated with their account and thereby authenticate the user for that transaction. In an embodiment a basic transaction process may include the following steps (see FIG. 4):

The OTP application is supplied with a transaction code in response to a transaction initiation step, for example a user attempt to buy a product or service on-line from a client web-site OTP application requests user to enter a secret key such as a PIN User enters PIN into OTP application.

OTP application uses PIN and transaction code to generate an OTP, which can be supplied to the user or directly to an element of a communication network such as an authentication server or client web-site.

OTP is supplied to authentication server. Whether or not this is sent by the same communication channel as the one used to send the transaction number to the user will be configurable per implementation, depending on the level of security required. For example, in a mobile phone based implementation, both the transaction number and OTP may be communicated via SMS. Alternatively, the user may be required to submit the OTP via the Internet, possibly on a separate device.

Authentication server uses the OTP function associated with this user to generate an OTP using the PIN stored at registration and the transaction number sent to the user device in respect of this transaction. Alternatively, the server uses the reverse OTP function, the received OTP and the transaction number and compares PINs, or alternatively the authentication is achieved using the stored PIN and the received OTP in the reverse OTP function and compares the resultant transaction number with the transaction number associated with that transaction.

Server compares this OTP with the one supplied with the user and, if they match, allows the transaction to complete.

In the event that the authentication server cannot authenticate the user, because the OTP is incorrect, the server will prompt an error message and a new transaction code is sent to the application so that a further attempt can be made at authentication. However, other mechanisms for dealing with authentication failure are known and the particular process chosen will depend on the circumstances, including the type of transaction, the implementation platform and other factors. Systems may also be provided in the event that the user forgets his PIN or loses his user device on which the OTP application is resident.

The OTP application may include routines for performing other tasks, in particular, once the OTP function script has been implemented the OTP application may purge the memory of all traces of the transaction code or codes, the user identification code and any other secret keys.

Authentication System

Figure 5:
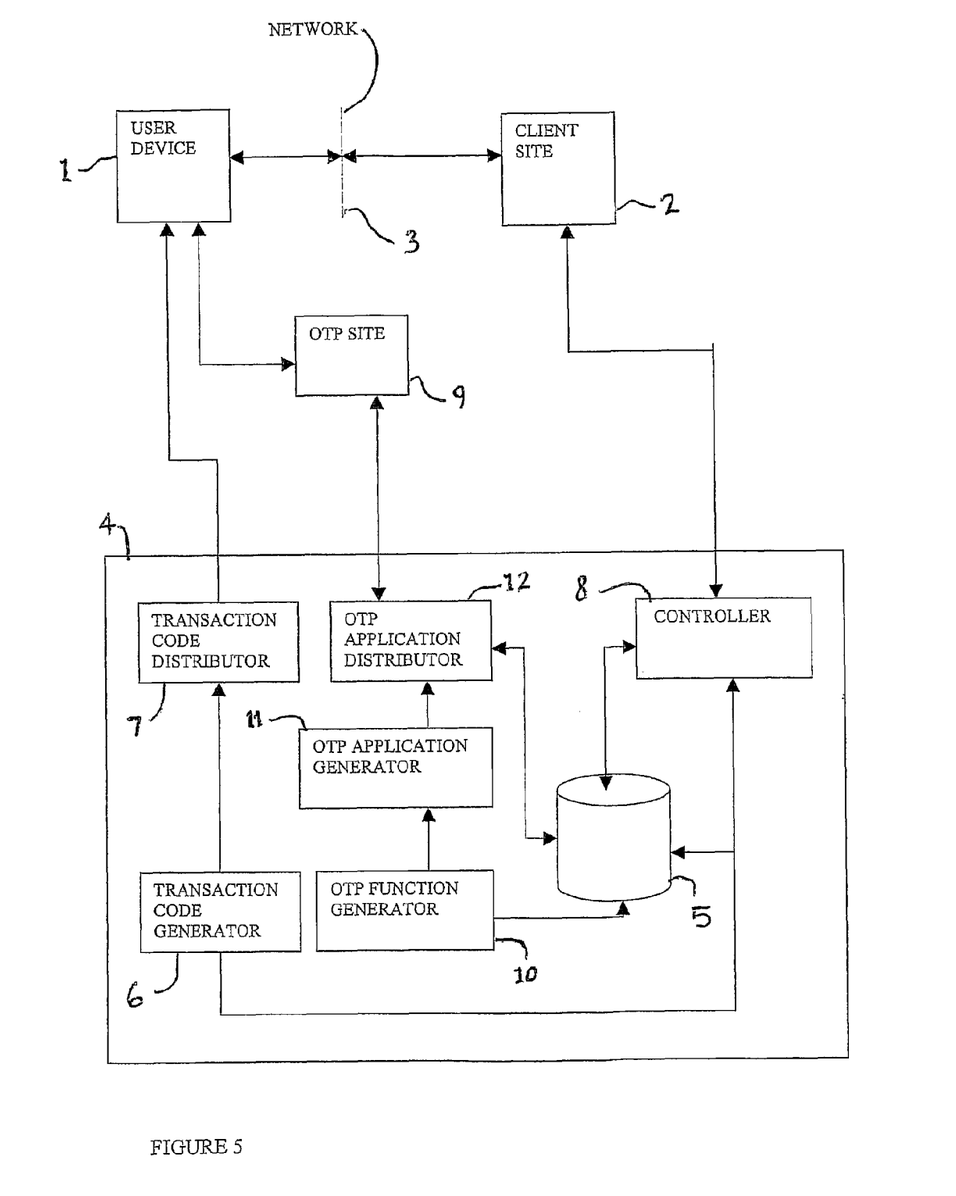
FIG. 5 is a box diagram of a system operative in accordance with an embodiment of the present invention.

FIG. 5 is a block diagram showing the functional elements of the authentication system according to an embodiment of the present invention. The figure shows schematically only those elements required for an understanding of the invention and is not intended to be limiting.

Referring now to FIG. 5, a user device 1, in this case a WAP enabled mobile communication device such as a mobile telephone, is connected by a network connection to a client site 2. The client site is typically a web site that requires secure access because, for example it's content is supported by subscriptions, or the site is used for payment transactions for the purposes of goods or services. The client site may also belong to a bank or other financial institution where security and user authentication is particularly important. The client site may be a single web page or more usually a series of linked pages that may be hosted on a single server or a plurality of unrelated servers connected by the Internet. The dashed line 3 represents the network connection. The connection in this embodiment is by the Internet but the connection could be by any similar network or even a peer-to-peer connection.

For example, a banking web site may require the use of the OTP in the event that the amount of the transaction is higher than £500.

The client site 2 uses an authentication server 4 in order to authenticate users of the client site 2 before allowing access to the site or before allowing certain transactions to occur, such as purchasing goods or services. The client site 2 requests, as part of the security process, an OTP from the user, that is a pass word or pass code that is unique to that transaction. The term 'transaction' is not intended to be limited to a financial transaction, but to any permission, for any purpose between two parties where the second party wishes to authenticate the identity of the first party before granting the permission.

It is to be noted that the OTP may be merely part of a security process, which may include several steps and include various challenges to the user. In particular it would be common for the user of a commercial web-site to enter a user name and a password—a permanent static password—in order to logon to a website. The request for an OTP for a particular transaction may be simply an additional security step for individual transactions held between the user and the client site 2.

In FIG. 5 the authentication server 4 is shown as a single entity, but it is not intended to imply that all of the elements of the authentication system need be in the same location, or resident on the same computer, and distributed solutions are envisaged. For simplicity the authentication system is shown schematically as being on a single authentication server 4 in FIG. 5.

In most cases it will be necessary for the user to register the user device 1 with the authentication server 4 before the authentication process can proceed. In the case of a registered user, the authentication system 4 will have user identification information stored in a memory 5. The user identification information may include the usual details such as name and address and may include the static password used to log onto the client site. More particularly, the authentication system has access to one or more private keys known to the user of the user device 1. The private key or keys are used in the production of OTPs on the client device 1 as discussed above.

The authentication system includes a transaction code generator 6 and a transaction code distributor 7. When a transaction of the type requiring a transaction code is initiated, a controller or CPU 8, on receipt of a request from the client site 2, instructs the transaction code generator to provide a transaction code to the distributor to be provided to the user device.

The transaction code may be provided to the user device by an SMS message or by any convenient communication channel. In general, the transaction code will be provided directly to the OTP application and will not be presented to the user. At least in the registration process (and in other transactions where a new application is issued to the user) the transaction code may be provided to the application before the application is provided to the user. However, where greater security is required the transaction codes and OTP application are supplied by different communication channels. In the present embodiment, the transaction code is provided by an SMS message and the OTP application by a WAP push as described below.

In the present embodiment the OTP application is provided to the user device by a WAP Push, which is effectively a simple SMS within the header of which is included a link to a WAP address. On receiving a WAP Push, the user device 1 will automatically give the user the option to access the OTP site 9. In this way the WAP Push directs the end user to a WAP address where the OTP application for that user is stored for downloading to the handset. The use of SMS messaging is not intended to be limited to such messaging on GSM networks but includes all similar communication channels including 3G networks and alternatives such as SkyMail (RTM) and NTT Docomo's Short Mail. E-mail messaging from mobile telephones, such as NTT Docomo's i-mode and the RIM BlackBerry (RTM), also use typical standard mail protocols such as SMTP over TCP/IP. The present invention can be implemented with whatever communication channels are available in the chosen system.

The OTP application contains one or more OTP scripts. The OTP scripts are compiled codes derived from an OTP function for implementing an OTP function on the user device 1. The OTP functions are generated by an OTP function generator 10, which will be described in more detail below. The function or functions for a particular OTP application are stored in memory 5 and associated with the user of user device 1. For any particular transaction, therefore, the transaction code, the secret keys and the OTP function are accessible to the controller 8 from memory 5. The authentication of the transaction can be made as discussed above by comparison of the OTP provided by the user device 1 to the client site 2 with the OTP produced by the controller 8 on the basis of the information associated with that transaction. Authentication can then be communicated to the client site 2.

The OTP application generator 11 embeds an OTP script for implementing an OTP function in an OTP application, which is supplied to the user device by the OTP application distributor 12 as discussed above. The OTP function and application are discussed in more detail below.

The OTP Function

Figure 6:
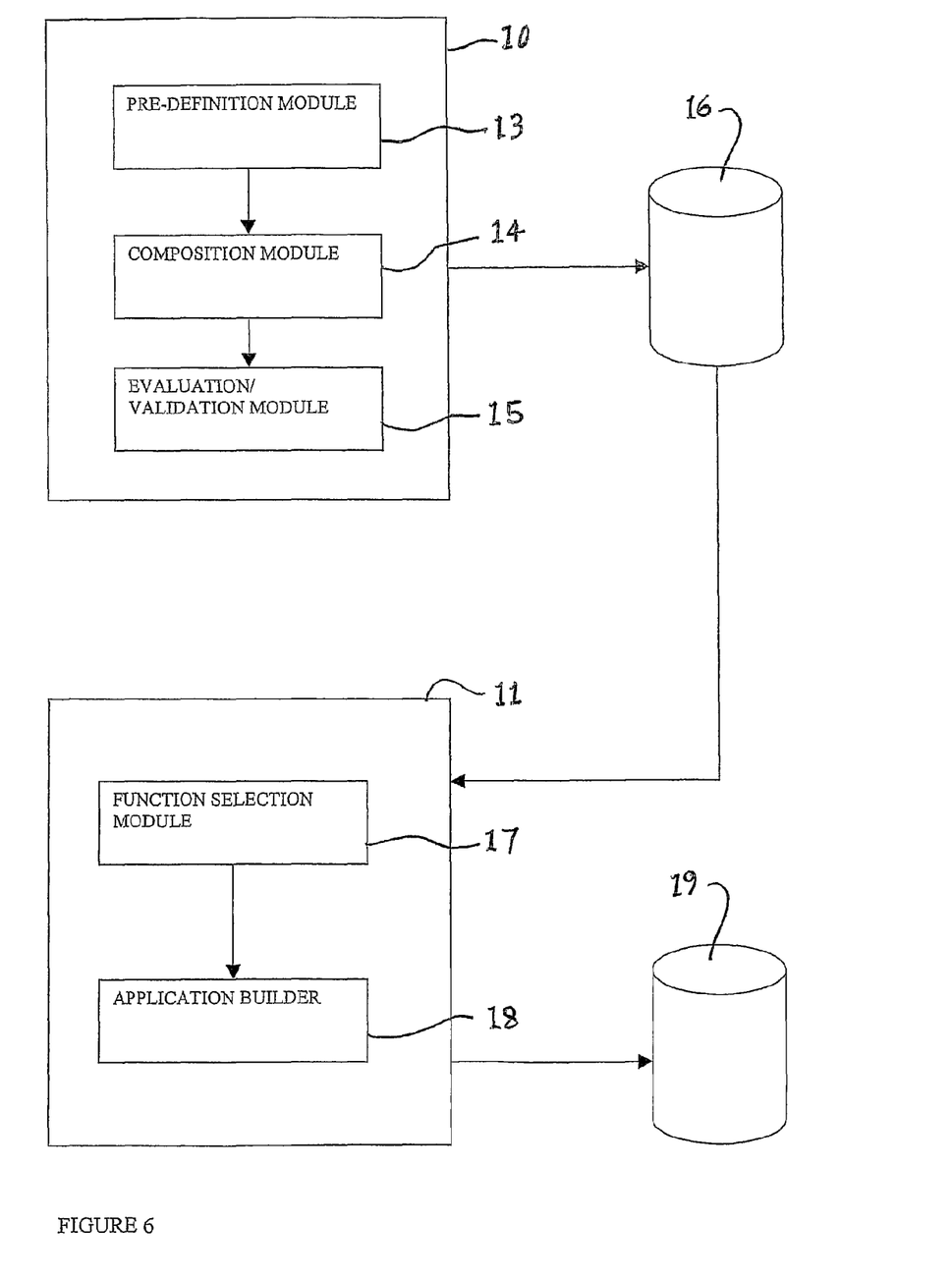
FIG. 6 is box diagram showing elements of an OTP application generator according to an embodiment of the invention.

Referring now to FIG. 6, which shows functional elements of the OTP application engine, including the function generator 10 and the application generator 11.

The function generator includes a pre-definition module 13, a function composition module 14 and an evaluation/validation module 15.

In the present embodiment the OTP functions are composite functions. The OTP function is an algorithm consisting of a random selection of predefined functions such as mathematical functions combined using a random selection of mathematical operators.

For example, an OTP function may include the functions $f(x)=\sqrt{(x)}$, and $g(x)=x^2-5x$. The operators may include addition, subtraction, multiplication, division and their domains. In order that there are sufficient possibilities for unique functions there are preferably a large number of possible functions that can be selected. However, the number of unique OTP functions is not limited because the number of arguments, that is the length of function string, is not fixed.

The OTP functions may differ not only in the number of arguments but also in the number of results, different families of functions and the range of inputs and outputs.

OTP functions can include some or all of the following:
a) mathematical functions and operations
b) string manipulation
c) date calculation
d) bit manipulation (shifting, rotation, etc.)
e) computer logic commands, flows, and conditions (loop, IF statements, etc.)
f) embedded hard coded values; and
g) data structure processing.

Other possibilities will suggest themselves to those skilled in the art.

The pre-function definition process, therefore, results in a library of function components including all of some of the above possibilities. The function composition module 14 randomly selects from the library of function components to generate a series of composite functions. Each of the composite functions is then tested by the Evaluation/Validation module 15 to ensure that the function meets various requirements. For example, the evaluation/validation module 15 may determine that the new composite function is, within certain parameters, unique, of sufficient complexity to give the desired degree of security, and whether two different functions produce the same OTP given the same inputs. Furthermore, the value or values produced by the function must be valid. The validation module ensures that each function is reversible, i.e. that it is a symmetric function.

In an embodiment of the invention the validation module ensures that each function is unique and is not presently in use in any OTP application. That is the validation module has access to all functions presently associated with all users in the system and compares the randomly generated composite function with the database of all functions. Alternatively, the validation module 15 may ensure that the function is truly unique, by comparing the function with all functions ever issued by the application generator 11. Where the security demands would be satisfied by less stringent demands, the validation module could be set to allow a predetermined level of reuse of OTP functions. In other embodiments the validation module may simply ensure that each batch of composite functions is unique, where the application generator 11 generates OTP applications for different clients (where it is not a proprietary system) the OTP application might simply ensure that each batch of OTP functions contains unique functions. The random generation of functions ensures that knowledge of one set of functions does not assist in determining another batch of functions.

A library of validated functions is then stored in database 16. When a new OTP application is to be generated by the application generator 11, a function selection module 17 selects, e.g. randomly, a function from the library of functions stored in database 16. The OTP application builder 18 receives the composite function, which is the OTP function to be embedded in the OTP application and which is associated with the user to which the OTP application will be provided. The application builder 18 will then parse the composite function and build a program script for compiling by an application compiler. The application compiler takes a basic application and embeds the OTP function script into the basic program to form the OTP application. The compiled OTP application is stored in memory 19 for subsequent provision to the application distributor 12.

In the above-described embodiment, a single OTP function is embedded in the OTP application and provided to the user device. In an alternative embodiment an OTP application provided to the user device has a plurality of different OTP functions, there is no limit on the number of functions that might be embedded in the OTP application, except in that the memory and processing power of the user device might put a practical or commercial limit on the number of OTP functions. In this case, the transaction code sent to the user device may be a code that is used by the OTP application to select one of the embedded OTP functions to be the OTP function for that transaction. In this case, there may be only one input to the OTP function, the user identification code. Of course, the OTP functions may accept further secret keys from the user. Furthermore, whilst the transaction code may be used to select the OTP function this is not the only possibility. The transaction code may be used as an input to the OTP function as in the case of the embodiment where there is a single OTP function and a separate code may be provided by the authentication server for selecting one of the OTP functions.

Thus, in the present invention, not only is it possible to have a unique OTP function for each user device or each user, but it is also possible to change the OTP function periodically, including selecting a new OTP function for each transaction, without installing a new OTP application. Even in the case where there is a single OTP function embedded in the OTP application the behaviour of the OTP function can be changed (for example, for each transaction) by control codes sent by the server as inputs to the OTP function.

Two-Way Authentication

Also known as mutual authentication refers to two parties authenticating each other. In other words, a client or user authenticates themselves to a server and that server authenticates itself to the client or user in such a way that both parties can be assured of the other party's identity.

Two-way authentication is particular useful in fighting active (direct) 'pharming' or 'Fishing'. It is a mechanism by which the user can validate that a response from a server is genuine.

The two-way protocol of the present embodiment, described below, can be used in conjunction with the other techniques described herein. In the present embodiment, the OTP protocol described above is used to implement two-way authentication. During two-way authentication the user registration and authentication (transaction process) are performed as described above and in connection with FIGS. 3 and 4, for example.

Figure 3:
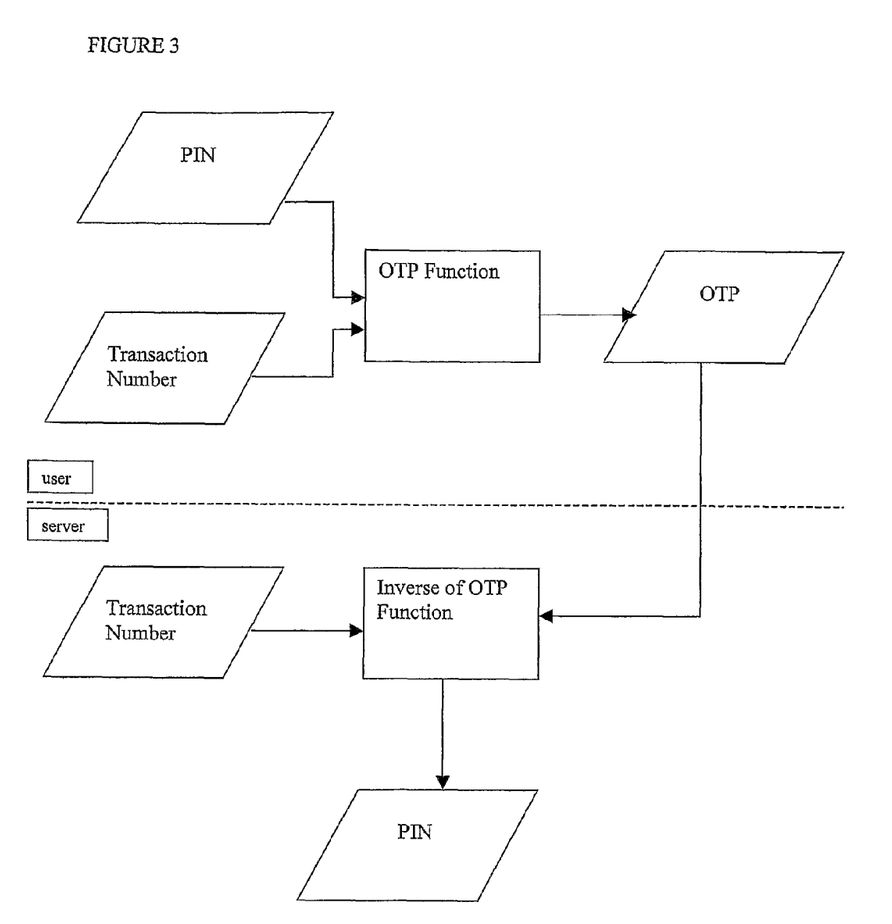
FIG. 3 is a flow diagram representing registration process according to an embodiment of the invention.
Figure 7:
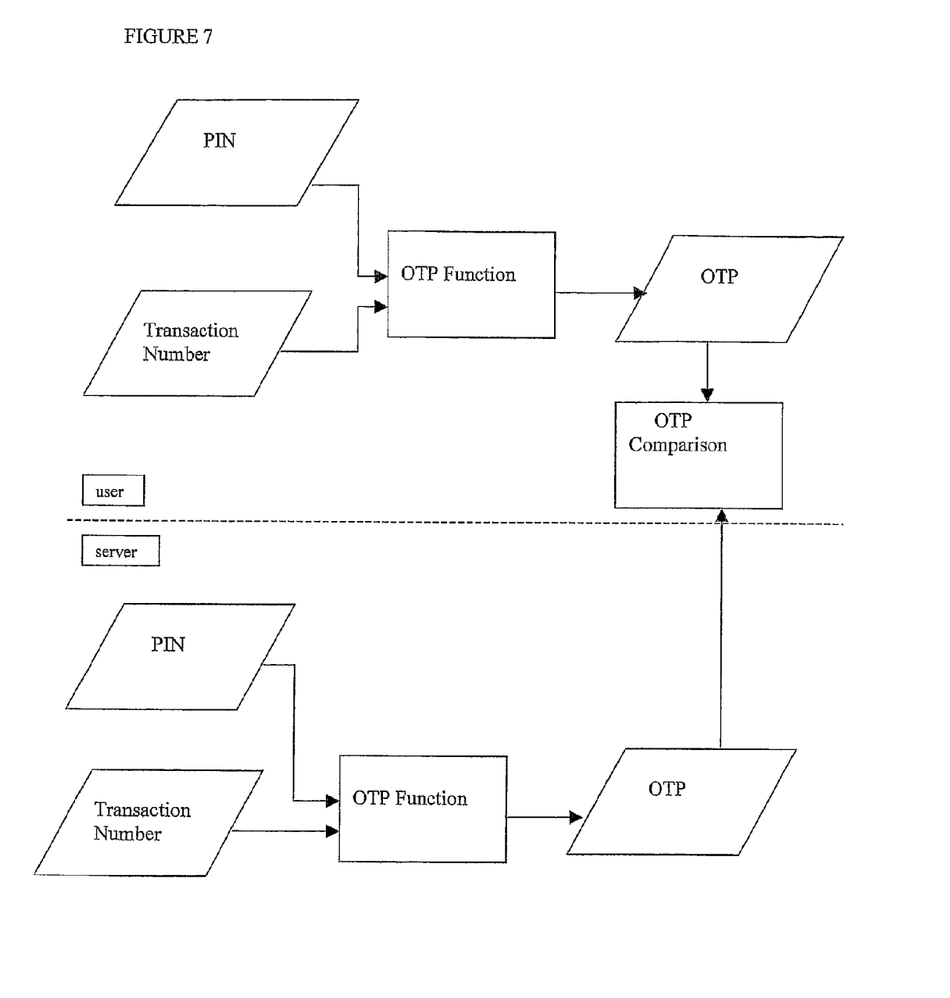
FIG. 7 is a box diagram showing an authentication process according to the present invention.

FIG. 7 is a box diagram useful for explaining the authentication of the server in the two-way authentication process and does not show the complete two-way authentication process but must be considered with the FIGS. 3 and 4 and the explanation provided above in connection with registration and authentication of the user.

FIG. 7 assumes the user has already been registered; the server already has the user's secret key, in this case labelled a PIN. The server generates a transaction code and calculates an OTP using the OTP function associated with the user based on the user's PIN and the new transaction number. The transaction number is supplied to the user. The OTP is also supplied to the user or user device and the OTP and transaction number in an embodiment are supplied through different channels.

The OTP application requests the PIN from the user and generates an OTP using the OTP function based on the transaction code and the user's PIN. The OTP application or other application runs a comparison of the OTP generated by the user device with the OTP supplied by the server in order to authenticate the server to the user.

In an embodiment the authentication of the server on the user device comprises:
  Server producing one or more transaction numbers and calculating an OTP based on the user's OTP function and secret key or keys.
  Server sends OTP and transaction number to the user or user device
  The calculation of the OTP is repeated on the user device
  User device compares that the same OTP has been calculated and authenticates the server if the OTPs match.

In the above embodiment the transaction number is generated at the server end, but in another embodiment the client device may be programmed to produce the transaction number and to supply this to the server for calculation of the OTP. Furthermore, there may be multiple validations of the OTP comparison between the server and the users. For each validation there will be a new transaction code. The authentication process is a symmetric process, meaning that it can be applied in the same way on the client side as well as on the server side. Thus, not only multiple validations in one direction (user to server or server to user) but also authentication in both directions, one or more times is possible.

The OTP may also be returned to the user (and vice versa) in more than one part over different channels, for example displayed on a web site and sent by text message.

In the above embodiment the user device is arranged to compare the OTPs automatically to authenticate the server, but this authentication can be done manually by displaying the OTPs to the user. The server generated OTP may be displayed (in full or in part), for example, on a website, or may be sent to the user by text. Various comparison techniques will suggest themselves to those skilled in the art without departing from the scope of the present invention.

In an implementation of the techniques of the present invention the security level of the system can be varied. For example, the number of challenges required by the user in order for the authentication to occur may be varied, or the challenges that are made to the user may be changed periodically. For example, on a first log on the user may be asked for his PIN and post code (Zip code) and in a second log on the user may be asked for the PIN and date of birth. Thus the number of challenges and the questions asked may vary randomly overtime. This can be achieved by the use of metadata tables that define the number of challenges a user needs to enter before permission is granted.

In the embodiment shown in FIG. 5, the user is interacting with the client website via the same device which has the OTP application. With modern telecoms equipment it is possible that the same equipment provides two or more channels of communication. However, it is envisaged that the present invention could be used to separate the channels of communication, so that a mobile telephone for example is the user device having the OTP function but that the transaction is being performed either in person (at a bank for instance) or on a separate machine (e.g. a PC or shop terminal). The person attempting the transaction must be in possession of the telephone in order to be able to obtain the required OTP. Whilst an unauthorised person may be able to get hold of a mobile telephone or alternatively gain access to the users PC, it is unlikely that they can gain access to the PC and to the mobile telephone and to the users PIN.

The OTP application is therefore a soft token equivalent to a hard token normally required for secure two-factor authentication. However, the same OTP application can be used to support different secure keys, e.g. two people can share a mobile phone and to authenticate themselves using different PIN numbers.

In an embodiment there is envisaged a joint account system, where multiple users each have OTP applications. In order to authorise or authenticate the transaction all of the users linked to this account need to supply their correct OTP.

The process can be used by people as well as machines, e.g. two servers can use the solution to authenticate a B2B transaction.

For less restricted security level policies we can, for example, decide to have a "Cool off period" in which the user has to send the OTP number back to the server via a different channel. For example via a separate device to the one supporting the OTP application. The cool off period can be calculated based on a time limit or the amount of the transaction.

The solution is flexible enough to support different types of security level, for example, a bank can decide to allow the OTP generated by the OTP application to be sent back to the authentication server, only via the web site for eBanking, that is the OTP application is for example on a mobile telephone and the transaction code is received via SMS. The OTP is returned by a different communication channel, that is, the Internet.

As previously stated, the present invention might be only part of a security system and might only form a part of the authentication process for any particular transaction. The invention can be used with other security features without any limitation. For example, the user device may be part of the GPRS system or other system providing an indication of the user device location. The authentication process may therefore include a check on the location of the user device.

It is appreciated that various features of the invention which are, for clarity, described in the contexts of separate embodiments, may also be provided in combination in a single embodiment. Conversely, various features of the invention that are, for brevity, described in the context of a single embodiment, may also be provided separately or in any suitable sub-combination.

The algorithm engine of the above embodiments is useful in other applications. The basis of the algorithm engine is the use of a number of stock functions and operators combined in various ways to produce a large number of new OTP functions. An embodiment of the OTP application engine is shown in FIG. 6. The OTP functions and applications can be used in specific applications as follows:

At present, software packages are in general licensed to the user and, in essence, there is generally a single algorithm used to generate the security code or number for each copy of the software. Once the algorithm has been broken, possibly by a brute force attack, counterfeit copies of the product can be made with 'valid' security codes that will be accepted by a validation server. The algorithm cannot be changed without invalidating legitimate copies of the software.

An alternative is to have different domains having different algorithms, which means that an algorithm can be invalidated and that will only affect legitimate copies in the same domain.

The present invention can be used to provide a unique algorithm for each software package by providing an OTP application according to the invention for each package. The OTP application, including an instance of the OTP function is associated with a transaction code. The OTP function is unique for each software package or for each software package in a domain, thereby rendering hacking of the algorithm unprofitable because hacking the OTP application will only affect the single instance of the OTP application.

In the present application of the invention the OTP application does not require a separate PIN—the secret key or identification code can be thought of as being fixed or redundant.

Whilst the present application has been discussed in terms of software packages, the identity of the product being authenticated is not relevant to the license OTP application and the technique can be applied to any product or authentication/verification scenario, such as voting whether online or not, user access etc. In particular, the OTP application can be attached a media file for securing such files distributed by electronic means such as over computer networks.

The present invention is not limited to software solutions; an OTP function generated by the OTP algorithm engine could be embedded in a card, such as a memory card or IC card, a token, ticket or the like. Such a physical identification means would have no inputs and the unique or nearly unique algorithm would be associated with the user by the authentication system. Such a system could be used in banking or voting scenarios for example to identify a person.

The OTP application of the present invention allows a biometric device to be used for authentication over a network such as the Internet. Each biometric device is given a separate OTP application and the identification code for the OTP application is the input biometric data. This is an example of an alternative method of entering the secret key or identification code, where required for the OTP function.

In the prior art, the output from the biometric device is a relatively fixed value that is the biometric device validates at the user end. The use of the present invention allows the authentication of users at the non-user end, for example by an authentication server. The authentication server can authenticate the user, by knowledge of the OTP application associated with the biometric device and on the basis of the biometric information, which is conveniently pre-registered with the authentication server. In this embodiment the transaction code is not required to be separately supplied for this embodiment, but may, for instance, be generated within the biometric system itself. However, the biometric device may be used in conjunction with an OTP application server in accordance with the more general embodiments of the authentication technique of the invention. In which case the various options for provision of the transaction code equally apply to the present embodiment.

Furthermore, the OTP application may accept one or more further inputs such as the user's PIN.

Whilst embodiments of the invention have been described by way of example, modifications and equivalents will suggest themselves to those skilled in the art, without departing from the scope of the invention as defined by the appended claims.

The invention claimed is:

1. An authentication server comprising:
a memory configured to store a user identification code associated with a user;
function generator software configured to generate a plurality of functions that each produce a pass code based on at least one input by the user, said at least one input comprising said user identification code;
a memory configured to store at least one function of said plurality of functions and associate the function with the user;
application generator software configured to generate an application for execution on a user device, wherein the application implements said at least one function on the user device;
an application distributor configured to distribute the application to the user device;
a transaction code generator configured to generate a transaction code associated with a transaction;

a transaction code distributor configured to distribute the transaction code to the application; and a controller configured to receive the pass code for said transaction from the user device and configured to authenticate the transaction on the basis of the received pass code, the function associated with said user, the user identification code and the transaction code associated with said transaction.

2. An authentication server as claimed in claim 1, wherein said functions are symmetric functions such that at least one input can be derived from knowledge of the remaining inputs, the function and the output.

3. An authentication server as claimed in claim 1, wherein at least two of said functions are functionally unique.

4. An authentication server as claimed in claim 3, wherein said at least two functions are associated with different users.

5. An authentication server as claimed in claim 1, wherein said application implements more than one of said functions.

6. An authentication server as claimed in claim 5, wherein the server sends a control code to said application to select one of said functions.

7. An authentication server as claimed in claim 5, wherein said transaction code is used to select one of said functions to implement for said transaction.

8. An authentication server as claimed in claim 1, wherein the user identification code and the transaction code are used as inputs to said function.

9. An authentication server as claimed in claim 1, wherein said function generator, comprises a library of function components and is arranged for selecting randomly from said function components to provide said function, wherein said function is a composite function.

10. An authentication server as claimed in claim 1, wherein said function generator is arranged for validating the functions.

11. An authentication server as claimed in claim 10, wherein said function generator is arranged to perform a comparison with a predetermined selection of previously generated function and rejects the generated function if a predetermined level of duplication is exceeded.

12. An authentication server as claimed in claim 11, wherein each function in a batch of functions is unique.

13. An authentication server as claimed in claim 1, wherein the identification code is derived from biometric data.

14. A method of performed by an authentication server including a hardware processor and a memory, the method comprising:

storing a user identification code associated with a user in the memory;

generating a plurality of functions that each produce a pass code based on at least one input by the user, said at least one input comprising said user identification code;

storing at least one function of said plurality of functions in association with the user in the memory;

generating an application for execution on a user device, wherein the application implements said at least one function on the user device;

distributing the application to the user device;

generating a transaction code associated with a transaction;

distributing the transaction code to the application on the user device; and receiving the pass code for said transaction from the user device; and authenticating the transaction on the basis of the received pass code, the function associated with the user, the user identification code and the transaction code associated with said transaction.

15. A communication device including a hardware processor, an input device, and a memory storing an authentication application executed by the processor, the authentication application including at least one pass code algorithm associated with a user embedded therein, the authentication application generating a pass code based on a transaction code generated for a particular transaction and an identification code identifying one of a person or an article to be authenticated, wherein the identification code is received from said user of the communication device via the input device of the communications device.

16. A communication device as claimed in claim 15 including an authentication application for receiving a pass code generated by a third party in connection with a transaction and for comparing the received pass code with a pass code generated by the application on the communication device to authenticate the third party.

17. A communication device as claim in claim 15, wherein the authentication application includes a plurality of pass code functions embedded therein, wherein the pass code functions are composite functions derived from a plurality of partial functions; and the application is adapted to receive the transaction code from an authentication server and to select a pass code function to be used to generate the pass code based on the transaction code.

* * * * *

UNITED STATES PATENT AND TRADEMARK OFFICE
CERTIFICATE OF CORRECTION

PATENT NO. : 8,935,762 B2
APPLICATION NO. : 12/666767
DATED : January 13, 2015
INVENTOR(S) : Guy Moas and Ram Gabay It is certified that error appears in the above-identified patent and that said Letters Patent is hereby corrected as shown below:

On the title page, in Item (73)

delete

"G-3 Vision Limited, London (GB)"

and insert

-- Minted Peas Technologies Limited, Ta'xbien, Malta (FR) --

Signed and Sealed this
Second Day of February, 2016

Michelle K. Lee
*Director of the United States Patent and Trademark Office*